(No Model.)

J. McMORRIES.
HORSE DETACHER.

No. 451,131. Patented Apr. 28, 1891.

Witnesses:
O. E. Van Doren.
J. Jessen

Inventor:
Jas. McMorries.
By Paul & Merwin Attys.

UNITED STATES PATENT OFFICE.

JAMES McMORRIES, OF THORP SPRING, TEXAS.

HORSE-DETACHER.

SPECIFICATION forming part of Letters Patent No. 451,131, dated April 28, 1891.

Application filed August 11, 1890. Serial No. 361,720. (No model.)

*To all whom it may concern:*

Be it known that I, JAMES McMORRIES, of Thorp Spring, Hood county, Texas, have invented certain Improvements in Horse-Detachers, of which the following is a specification.

My invention relates to improvements in devices or attachments for wagons or similar wheeled vehicles, by means of which the team connected to a wagon can be instantly detached therefrom at the will of the driver in case of accident or fright of the team and brakes applied to the wagon-wheels, so that injury to the wagon and occupants may be prevented; and it consists in an improved attachment to the brake rod or shaft of the wagon, connected also with the bolts which secure the shafts or pole in the clips on the wagon-axle, by means of which the brake-shaft may be rocked, so as to apply the brakes and stop the wagon, and at the same time withdraw the bolts which hold the shafts or pole, and thus disconnect them from the wagon.

My invention further consists in the construction and combination hereinafter particularly described, and pointed out in the claims.

Figure 1:
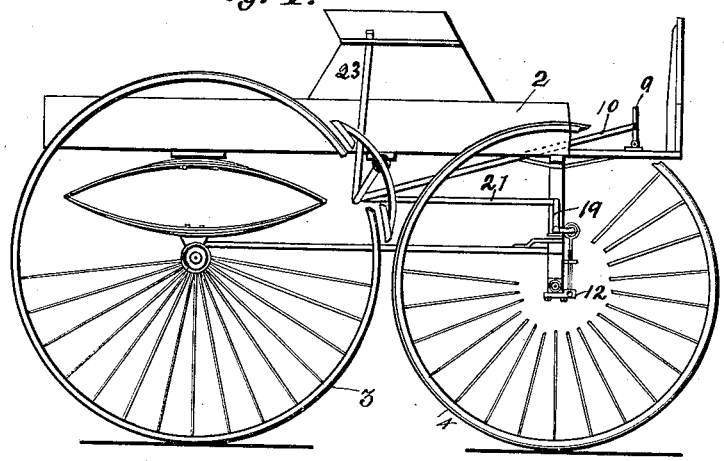
Figure 2:
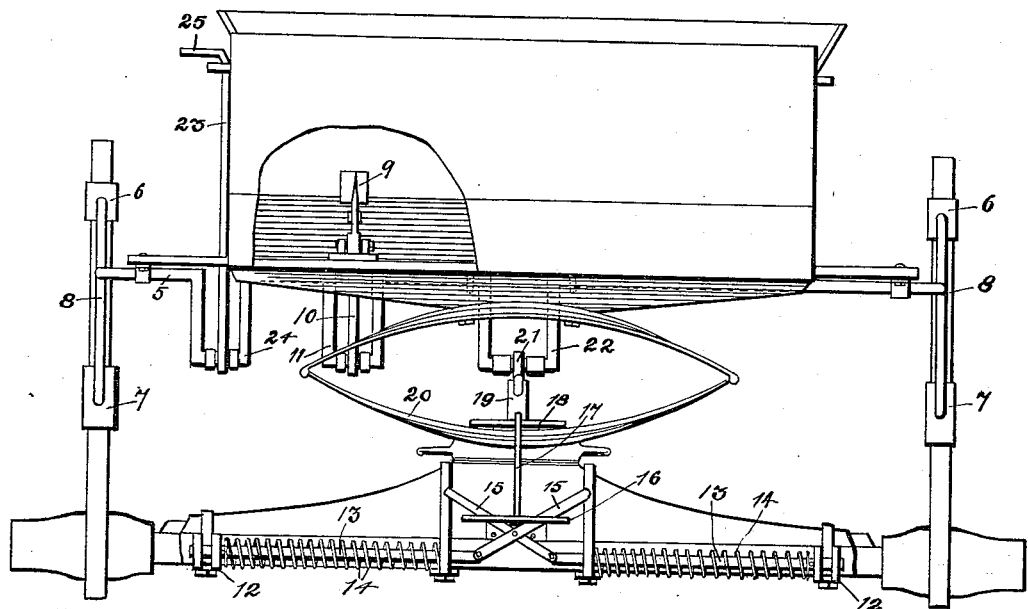

In the accompanying drawings, forming part of this specification, Figure 1 represents a side elevation of an ordinary road-wagon with my improved horse-detacher applied thereto, some of the parts being broken away to show the connections; and Fig. 2 is a front elevation of the same.

In the drawings, 2 represents the wagon-body, 3 the hind wheels, and 4 the forward wheels.

Arranged in suitable bearings or other supports transversely underneath the wagon-body is the brake rod or shaft 5, provided at each end with the brake-shoes 6 and 7, mounted upon the cross bar or arm 8, and so adjusted that by the rocking of the shaft 5 in one direction the shoes 6 are applied to the wheels, while by rocking it in the opposite direction the shoes 7 are similarly applied, the upper brake-shoes 6 being the ones employed in the ordinary use of the wagon.

The treadle 9, pivoted to the body of the wagon and conveniently arranged to be operated by the foot of the driver, is connected by means of the rod or link 10 to the bend or crank 11 of the shaft 5, so that by pushing the treadle 9 forward by the foot of the driver the shaft 5 is turned to bring the brake-shoes 6 against the wheels 3 in the ordinary manner.

The pole is secured to the forward axle in clips 12 of the ordinary form by means of sliding bolts 13, which pass through the ears of the clips and the eyes of the pole, the bolts being slidably supported in suitable bearings upon the axle, spiral springs 14, connected to the bolts, tending to hold them in engagement with the clips 12. The adjacent inner ends of the bolts 13 are pivotally connected with the crossed levers 15, which are themselves pivoted together. The upper ends of the levers are embraced by the loop or equivalent device 16, connected to the link 17, by which it is supported, the upper end of the link 17 being connected to the horizontal arm 18 of the bell-crank lever 19, which is pivotally supported upon the wagon-spring 20. The vertical arm of the bell-crank lever 19 is connected by means of the link 21 to the bend or crank 22 of the shaft 5, so that as the crank is turned backward the loop is lifted by the described connections, and, engaging with the levers 15, turns them on their common pivot, causing their ends to approach each other, and thus to withdraw the bolts from the clips 12. The rocking of the shaft 5 at the same time causes the brake-shoes 7 to be applied to the wheels 3.

While any convenient means may be used to rock the shaft 5, I prefer that shown in the drawings, which consists of the rod 23, arranged upon the side of the wagon-body and extending upward in convenient reach of the driver, the lower end being connected to the depending and backwardly-inclined bend or crank 24 of the shaft 5, so that when the rod 23 is lifted by means of its handle 25 the shaft 5 will be rocked in the opposite direction from that caused by the use of the treadle 9.

In the ordinary use of the wagon the treadle 9 only is used to apply the brakes, the bolts 13 not being moved, as the loop 16 merely drops downward without moving the levers 15.

In case of accident the handle 25 is grasped by the hand of the driver and lifted, thus rocking the shaft 5, and, by means of the described connections, throwing back the bolts 13 and applying the brake-shoes 7 to the wheels 3, whereby the wagon is stopped and the team detached, as above described.

I claim—

1. In a device of the class described, the combination of the brake-rod or rock-shaft having two sets of brake-shoes, one set adapted to be applied to the wheels of the wagon by the rocking of the shaft in one direction and the other by the rocking of the shaft in the opposite direction, means for rocking the said shaft in each direction, spring-bolts securing the pole to the wagon, pivoted levers connected to said bolts for withdrawing the same, and suitable connections between said levers and the brake-shaft, whereby as said brake-shaft is rocked in one direction the brakes are applied to the wagon and simultaneously the pole is detached therefrom, and when rocked in the opposite direction brakes are applied to the wagon without detaching the pole, substantially as and for the purposes set forth.

2. In a device of the class described, the combination, with the wagon-body, of a rocking crank-shaft journaled transversely beneath it, cross-bars upon both ends of said shaft, brake-shoes upon each of said cross-bars, one above and the other below said shaft, spring-controlled sliding bolts for securing the pole or shafts to the vehicle, crossed levers pivoted together and to said sliding bolts, a loop engaging the ends of said levers and adapted as lifted to close the same and to withdraw said bolts, a bell-crank lever having one arm linked to said loop and the other to a crank of said shaft, a treadle-lever linked to a crank of said shaft, by means of which the shaft may be rocked to apply the upper set of brakes, and a lifting-rod connected to a crank of said shaft, by means of which it may be oppositely rocked to apply the lower set of brakes and simultaneously disconnect the team from the vehicle, substantially as and for the purposes set forth.

3. The combination, with the wagon-body, of the crank-shaft 5, the cross-bar 8 upon each end of said shaft, the brake-shoes 6 and 7 upon the respective ends of said cross-bars, spring-controlled pole-securing bolts 13, the crossed levers 15, pivoted thereto, the loop 16, engaging said levers, and the bell-crank lever 19, having one arm linked to said loop and the other to a crank of said shaft, the treadle 9, linked to a crank of said shaft, and the lifting-rod 23, connected to another crank of said shaft, substantially as and for the purposes set forth.

4. In a wagon having a brake-shaft fitted with cross-bars carrying brake-shoes at both ends and means for rocking the shaft in either direction, the combination therewith of the spring-bolts 13, engaging the pole-clips 12, the levers 15, connected to said bolts, the loop 16, engaging the ends of said levers, and the bell-crank lever 19, having one arm linked to a crank upon the brake-shaft and the other to the loop 16, substantially as and for the purposes set forth.

In testimony whereof I have hereunto set my hand this 28th day of June, 1890.

JAMES McMORRIES.

In presence of—
  J. N. HOLLAND,
  D. M. EALY.